(12) United States Patent
Wang

(10) Patent No.: US 7,840,793 B2
(45) Date of Patent: Nov. 23, 2010

(54) METHOD OF FAST BOOTING FOR COMPUTER MULTIMEDIA PLAYING FROM STANDBY MODE

(75) Inventor: Szu-Chung Wang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 1009 days.

(21) Appl. No.: 11/476,119

(22) Filed: Jun. 28, 2006

(65) Prior Publication Data

US 2007/0055860 A1    Mar. 8, 2007

(30) Foreign Application Priority Data

Sep. 7, 2005    (TW)    .............. 94130762 A

(51) Int. Cl.
G06F 9/24    (2006.01)
G06F 15/177    (2006.01)
G06F 9/46    (2006.01)
G06F 9/44    (2006.01)

(52) U.S. Cl. .............. 713/2; 713/1; 718/100; 719/310

(58) Field of Classification Search ...... 713/1, 713/2; 718/100; 719/310
See application file for complete search history.

(56) References Cited

U.S. PATENT DOCUMENTS

| | | | |
|---|---|---|---|
| 6,177,908 B1 | 1/2001 | Kawahata et al. | |
| 6,239,753 B1 | 5/2001 | Kado et al. | |
| 6,449,724 B1 * | 9/2002 | Sakagami | .......... 713/300 |
| 6,687,518 B1 | 2/2004 | Park | |
| 6,763,458 B1 | 7/2004 | Watanabe et al. | |
| 6,980,156 B2 | 12/2005 | Komiyama | |
| 7,162,629 B2 * | 1/2007 | Zimmer et al. | .......... 713/100 |
| 7,226,293 B2 | 6/2007 | Na et al. | |
| 7,380,148 B2 * | 5/2008 | Montero et al. | ........... 713/324 |
| 7,549,041 B2 * | 6/2009 | Wang | ............ 713/2 |
| 2003/0110331 A1 * | 6/2003 | Kawano et al. | ............ 710/58 |
| 2004/0226020 A1 * | 11/2004 | Birmingham | ........... 719/310 |
| 2004/0237086 A1 * | 11/2004 | Sekiguchi et al. | ......... 718/100 |
| 2005/0182922 A1 * | 8/2005 | Guo et al. | ........... 713/1 |
| 2005/0228769 A1 * | 10/2005 | Oshima et al. | .......... 707/1 |
| 2005/0273663 A1 * | 12/2005 | Yoon | ........... 714/36 |
| 2006/0101259 A1 * | 5/2006 | Chen | ............ 713/2 |
| 2006/0123201 A1 * | 6/2006 | Wu | ........... 711/147 |
| 2006/0294556 A1 * | 12/2006 | Chen et al. | ............ 725/89 |
| 2007/0038685 A1 * | 2/2007 | Chan et al. | ............ 707/203 |

FOREIGN PATENT DOCUMENTS

DE    19713929 A1    11/1997

(Continued)

*Primary Examiner*—Vincent T Tran

(57) ABSTRACT

A method of fast booting for multimedia playing from a standby mode is provided, including installing at least a first operating system, a second operating system and the kernel of the second operating system in the hard disk of the computer. An event signal generating unit is connected to the computer. When the computer completes the booting process with the first operating system, a memory region for the kernel of the second operating system is established in the system memory, and the kernel of the second operating system kernel is loaded into the memory region. When the user shuts down the computer, the computer enters a standby mode. If the user operates the event signal generating unit when the computer is in the standby mode, the computer awakes and starts executing the second operating system kernel in the memory region and the computer enters the multimedia playing mode.

12 Claims, 6 Drawing Sheets

FOREIGN PATENT DOCUMENTS

| | | |
|---|---|---|
| DE | 19919383 A1 | 11/1999 |
| DE | 102005015710 A1 | 6/2006 |
| JP | 07-092953 | 4/1995 |
| JP | 10-262105 A | 9/1998 |
| JP | 2001-282560 | 10/2001 |
| JP | 2001-282560 A | 10/2001 |
| JP | 2002-132393 | 5/2002 |
| JP | 2005-216282 | 8/2005 |
| JP | 2005-216282 A | 8/2005 |
| TW | 565760 B | 12/2003 |
| WO | WO 2005/029301 A2 | 3/2005 |

\* cited by examiner

METHOD OF FAST BOOTING FOR COMPUTER MULTIMEDIA PLAYING FROM STANDBY MODE

FIELD OF THE INVENTION

The present invention relates to a method for booting computer multimedia devices and, more particularly, to a method for fast executing computer multimedia playing from a standby mode.

BACKGROUND OF THE INVENTION

The conventional method in computer technology is to install an operating system (OS) in a computer so that when the computer is booted, the OS, the device drivers, and applications in a hard disk of the computer will be loaded and executed after the basic booting process.

As the computer becomes more powerful, more and more applications are developed, and different functions of computers are also developed to meet the demands. For example, a typical application is to use a computer in conjunction with a multimedia player or a household appliance to become a more versatile multimedia system.

Because there are pros and cons for different OS, industrial suppliers provide multimedia systems with dual OS. The conventional technique is to configure the hard disk into to two hard-disk areas. The first area installs a first OS for normal computer operation mode, and the second area installs a second OS for multimedia operation mode.

However, when the computer completes the booting process, all the connected peripherals are activated and in a ready-to-play state, which consumes a considerable amount of power. To save the power consumption and prolong the life span of the computer system, most operating systems of personal computers, such as Windows XP, Windows 2000, and Windows Me, integrate power management function of the advanced configuration and power interface (ACPI). Therefore, the power management operation can be performed through the ACPI interface.

The ACPI interface manages the power usage of the peripherals. The ACPI interface specifies various power management states, including active, hibernation, standby and shutdown. Based on the user's setting, the computer system can enter the standby or hibernation state. The standby mode is a low-power state, and the hibernation state reduces further power consumption. In a typical ACPI structure, the power states are defined as:

S0: normal power supply state;

S1: first stage standby mode, in which the power to a central processing unit (CPU), memory and fan stays on while the power to monitor and hard disk is shut off;

S2: second stage standby mode, in which the power to CPU, cache, monitor and hard disk are off;

S3: third stage standby mode, in which only minimum power stays supplied to RAM;

S4: hibernation state, in which power to all the devices and elements are off, with the operating system storing all the data and execution states before terminating the power supply to the devices and elements; and S5: shutdown state, in which all the power supply is turned off.

Based on the user's setting, the computer system can enter the standby or hibernation state. The standby mode is a low-power state, and the hibernation state reduces further power consumption.

SUMMARY OF THE INVENTION

However, because the hardware structure and the functions are different between the computer and the multimedia player or household appliances, the booting time for the system integrating computer with multimedia player or appliances is usually much longer than that of turning on a multimedia player or an appliance.

Although the industrial suppliers have provided different operating systems for normal computer operation mode and multimedia mode operations, the computer system still needs to read the operating system from the hard disk at the beginning of the booting process before operating in the multimedia mode. That is, the user must boot the computer and wait for the computer to complete the BIOS activation, POST, peripheral detection and driving, OS activation, system configuration, and so on, and then execute the multimedia playing. This process is different from the way that a user operates a multimedia player.

A different approach is to keep the computer on all the time so that the user can activate the multimedia playing without waiting for the tedious booting process of the computer. However, this approach wastes power consumption as the computer stays on even when it is not in use.

The primary objective of the present invention is to provide a method of fast booting for computer multimedia playing from a standby mode. When a use turns off the computer, the present invention actually only puts the computer into a standby mode, so that when the user tries to execute the multimedia playing, the computer awakes from the standby mode and enters the multimedia playing mode immediately.

Another objective of the present invention is to provide a method of fast booting for multimedia system with a dual-OS computer. By installing two or more OS in a computer, the present invention allows the fast switch between different OS.

Yet another objective of the present invention is to provide a method for switching between different OS for a computer. By installing the kernel of a second OS in the system memory, the computer can fast switch to the second OS when the computer awakes from a standby mode.

To realize the above objects, the present invention installs at least a first OS, a second OS and the kernel of the second OS in the hard disk of the computer. An event signal generating unit is connected to the computer. When the computer completes the booting process with the first OS, a memory region for the kernel of the second OS is established in the system memory, and the kernel of the second OS is loaded into the memory region. When the user shuts down the computer, the computer enters a standby mode. If the user operates the event signal generating unit when the computer is in the standby mode, the computer awakes and starts executing the kernel of the second OS in the memory region and the computer enters the multimedia playing mode.

In a preferred embodiment of the present invention, a memory region for multimedia drivers and applications can be established in the system memory in addition to the memory region for the kernel of the second OS. When the computer awakes from the standby mode and enters the multimedia playing mode, the computer can execute the drivers and the applications stored in the memory region for the multimedia drivers and applications.

In comparison with the conventional technologies, the present invention allows the computer to enter a standby mode after the booting of the first OS. In the standby mode, the computer is ready to detect the occurrence of a pre-defined event signal. When an event signal is detected, the computer awakes from the standby mode and executes the kernel of the second OS to enter the multimedia playing mode. In actual applications, if the computer is integrated with an intelligent appliance (IA) or a multimedia playing function, the switching between the OS also achieves the switching between the normal computer operation mode and the multimedia playing mode or IA mode. Therefore, the user can save the time for a long booting process, as well as the power consumption. Furthermore, when a pre-defined second event signal is detected during the multimedia playing mode, the computer stops the multimedia playing function and the first OS awakes so that the computer enters the normal computer operation mode. Hence, the computer can be easily switched back to the first OS without rebooting the first OS.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
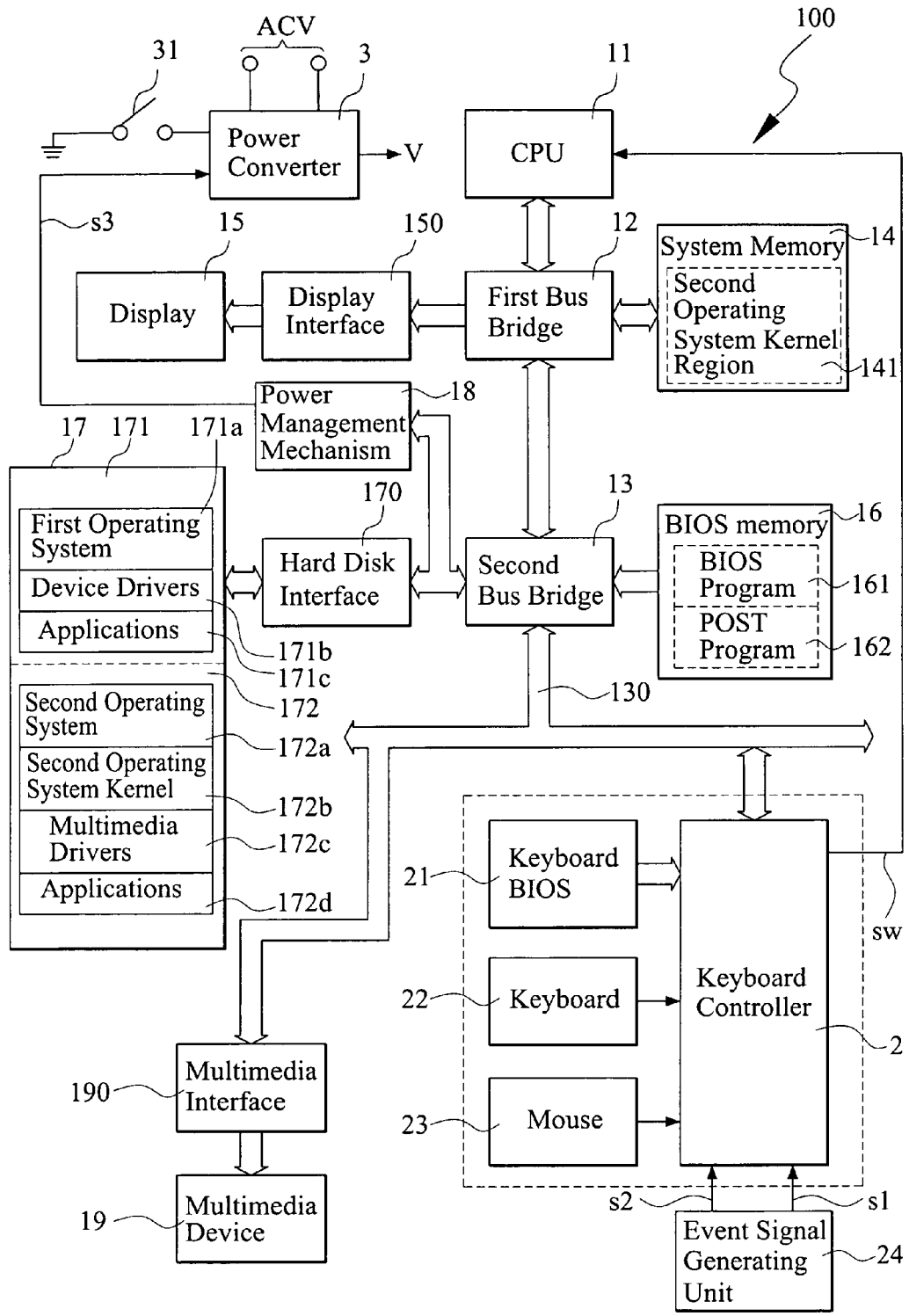
FIG. 1 is a system functional block diagram of a first embodiment of the method of fast booting for a multimedia system from a standby mode of the present invention.

With reference to the drawings and in particular to FIG. 1, which shows a system functional block diagram of a first embodiment in accordance with the present invention, a computer 100 comprises a central processing unit (CPU) 11, a first bus bridge 12, and a second bus bridge 13. The CPU 11 is connected to the first bus bridge 12 through a system bus. The first bus bridge 12 is connected to a system memory 14 and is connected to a display 15 through a display interface 150.

The second bus bridge 13 is connected to a BIOS memory 16. The BIOS memory 16 stores a BIOS program 161 and a power on self test (POST) program 162, both required for booting the computer.

The second bus bridge 13 is connected to a hard disk interface 170 through a bus. The hard disk interface 170 is connected to a hard disk 17. The hard disk 17 provides data storage for the present invention. The hard disk 17 is divided into a first partition 171 and a second partition 172. The first partition 171 is installed with a first operating system 171*a*. The operating system 171*a* can be the Windows operating system. When the computer 100 is booted with the first operating system 171*a*, the computer 100 operates under the first operating system 171*a*. The first partition 171 is also installed with various device drivers 171*b* and applications 171*c* required for the computer 100 to operate.

The second partition 172 of the hard disk 17 stores a second operating system 172*a* and a second operating system kernel 172*b*. The second operating system 172*a* can be a Linux-based operating system or other types of operating systems, such as Tiny Windows-based operating system or embedded operating system.

The second partition 172 also stores multimedia drivers 172*c* and applications 172*d* operating under the second operating system 172*a*. In actual applications, the multimedia drivers 172*c* and the applications 172*d* include drivers and applications for CD, digital music device, VCD, TV signal receiver, and so on.

The second bus bridge 13 is connected to a power management mechanism 18 through a bus interface. The power management mechanism 18 can be an advanced configuration and power interface (ACPI) or advanced power management (APM) mechanism. The power management mechanism 18 can be managed by the operating system or the BIOS.

The second bus bridge 13 of the computer 100 is connected to a multimedia interface 190 through a bus 130. The multimedia interface 190 is connected to a multimedia device 19. The multimedia device 19 can be a DVD player, MP3 player, CD player, a TV, and so on.

The second bus bridge 13 of the computer 100 is connected to a keyboard controller 2 through the bus 130. The keyboard controller 2 is connected to a keyboard BIOS 21, a keyboard 22, and a mouse 23.

The keyboard controller 2 is connected to an event signal generating unit 24. The event signal generating unit 24 comprises at least a button or an element capable of generating an operation signal. Under the user's operation, the event signal generating unit 24 generates a first event signal s1 of multimedia playing mode to the keyboard controller 2, and a second event signal s2 of normal computer operation mode to the keyboard controller 2. The first and second event signals s1, s2 can also be generated by pressing a pre-defined key of the keyboard 22.

In actual applications, the event signal generating unit 24 can be defined as a control key for fast activating a default multimedia player. The event signal generating unit 24 can be installed on the panel of the corresponding multimedia player, a button on the computer, or a button on a remote control.

A power converter 3 draws operation power from an AC voltage source ACV, and outputs DC output voltage V at various default voltage setting. For example, in a typical computer power supply system, the power converter 3 selectively outputs +3.3V, +5V, +12V, −5V, and −12V voltage sources. The voltage sources are supplied to different circuit elements through different loop. A switch 31 is connected to the power converter 3 for the user to operate. The power management mechanism 18 generates a control signal s3 to control the supply of the power converter 3. Hence, the computer 100 can operate in the normal computer operation mode, standby mode, or multimedia playing mode.

Figure 2:
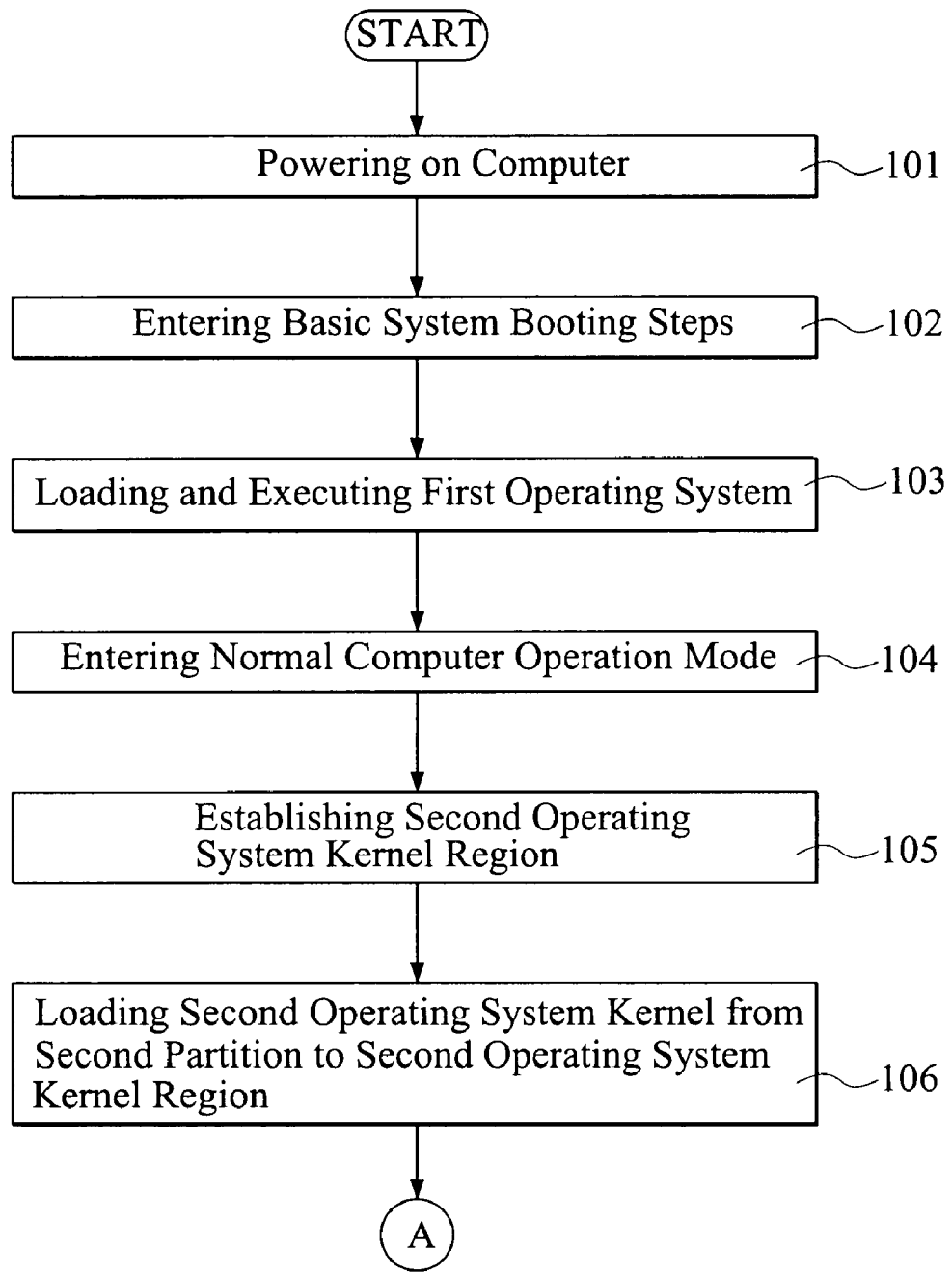
FIG. 2 is the first part of the control flowchart of the embodiment of FIG. 1.
Figure 3:
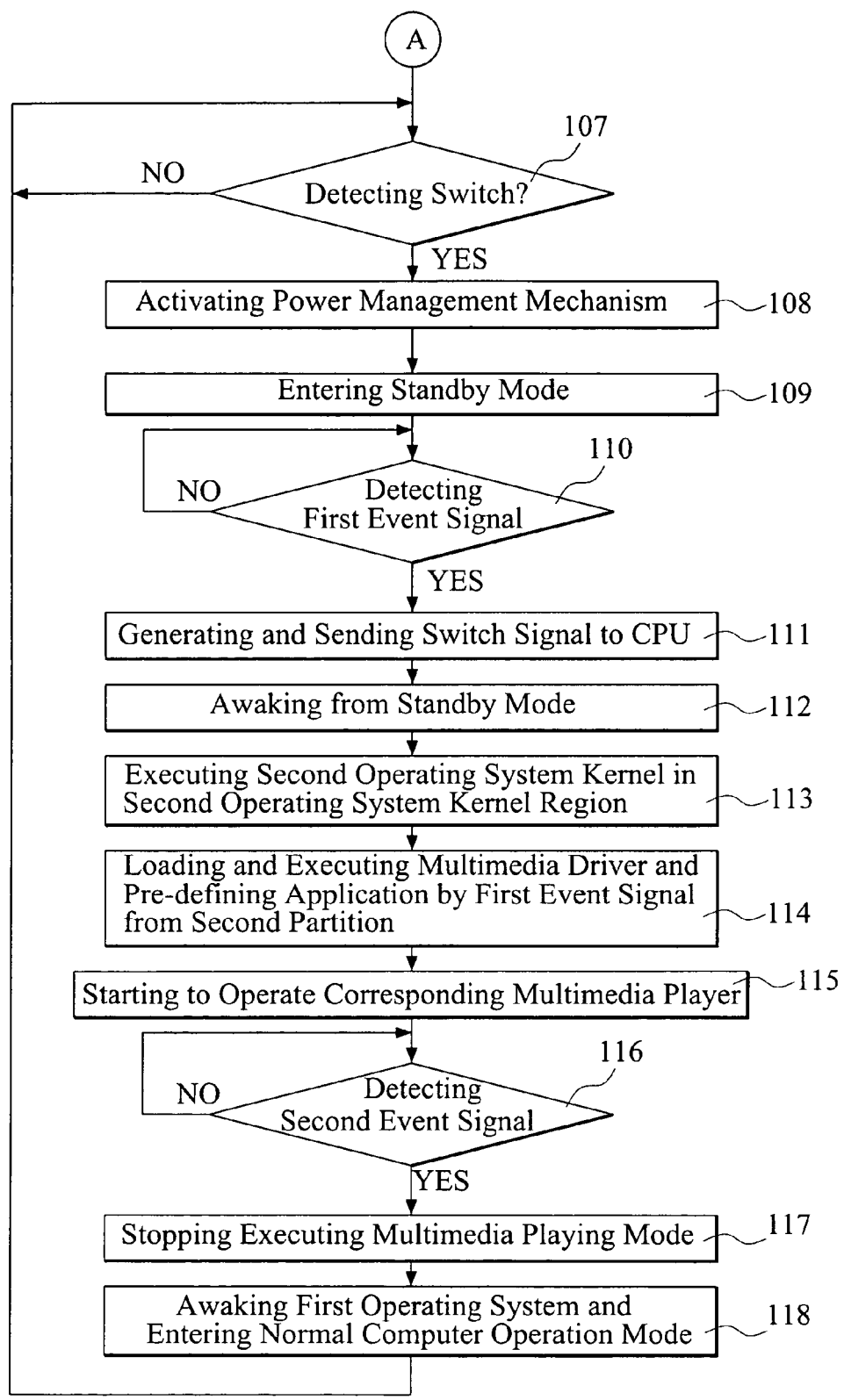
FIG. 3 is the second part of the control flowchart of the embodiment of FIG. 1.

FIGS. 2 and 3 show the control flowchart of the embodiment in FIG. 1. The following description refers to FIGS. 1, 2 and 3.

When the computer 100 is powered on (step 101), the computer 100 enters the basic system booting steps (step 102). That is, the computer 100 loads and executes the BIOS program 161 and the POST program 162 from the BIOS memory 16. Then, the computer 100 loads and executes the first operating system 171*a* of the first partition 171 of the hard disk 17 (step 103), and then the computer 100 enters normal computer operation mode (step 104). At this point, the user can operate the computer 100 in the normal computer operation mode.

After loading and executing the first operating system 171a, the computer 100 establishes a second operating system kernel region 141 in the system memory 14 (step 105), and loads the second operating system kernel 172b from the second partition 172 of the hard disk 17 to the second operating system kernel region 141 (step 106) with a protected mode to reside in the system memory 14. The second operating system kernel 172b can be stored in a compressed format to save the space required in the second operating system kernel region 141.

When the user operates the switch 31 to shut down the computer 100, the present invention detects the state of the switch 31 (step 107), and the power management mechanism 18 is activated (step 108).

Under the management of the power management mechanism 18, the computer 100 enters the standby mode (step 109) and the first operating system 171a also enters the standby mode. In the standby mode, the power supplied to the display 15, the hard disk 17, the CPU 11 is shut down, and only a minimum power is supplied to the system memory 14 and the keyboard controller 2.

After the computer 100 enters the standby mode, the keyboard controller 2 detects the state of the event signal generating unit 24. If the event signal generating unit 24 is pressed by the user, the event signal generating unit 24 generates a first event signal s1. The first event signal s1 is detected by the keyboard controller 2 (step 110), and the keyboard controller 2 generates a switch signal sw and sends the switch signal sw to the CPU 11 (step 111).

When the CPU 11 receives the switch signal sw, the computer 100 awakes from the standby mode (step 112), executes the second operating system kernel 172b in the second operating system kernel region 141 of the system memory 14 (step 113), and then loads and executes the multimedia driver 172c and the application 172d pre-defined by the first event signal s1 from the second partition 172 of the hard disk 17 (step 114) to enter the multimedia playing mode. In this way, the corresponding multimedia player 19 starts to operate (step 115) and the user can activate the multimedia playing without the tedious rebooting process of the computer 100.

During the multimedia playing mode, if a second event signal s2 is detected (step 116), the computer 100 stops executing the multimedia playing mode (step 117). That is, the computer 100 stops the second operating system kernel 172b, the multimedia driver 172c, and the application 172d. Then, the first operating system 171a is awakened and the computer 100 enters the normal computer operation mode (step 118). Hence, the computer 100 can switch to the first operating system 171a without rebooting.

Figure 4:
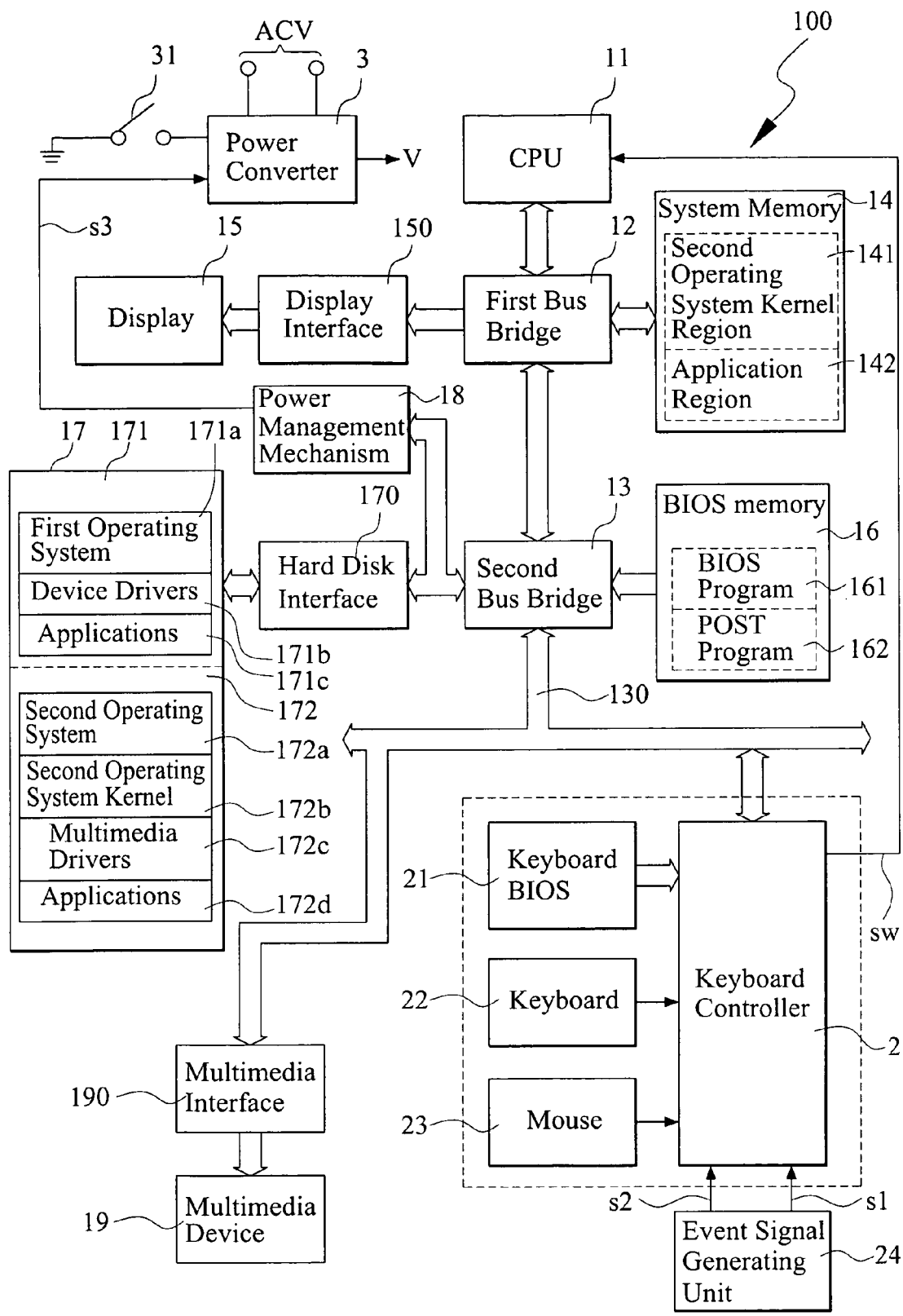
FIG. 4 is a system functional block diagram of a second embodiment of the method of fast booting for a multimedia system from a standby mode of the present invention.

FIG. 4 shows a system functional block diagram of a second embodiment in accordance with the present invention, which is similar to the first embodiment of FIG. 1, except the system memory 14. If the system memory 14 is sufficiently large, a multimedia driver and application region 142 can be established for loading the multimedia driver 172c and the application 172d of the second partition 172 in addition to the second operating system kernel region 141.

Figure 5:
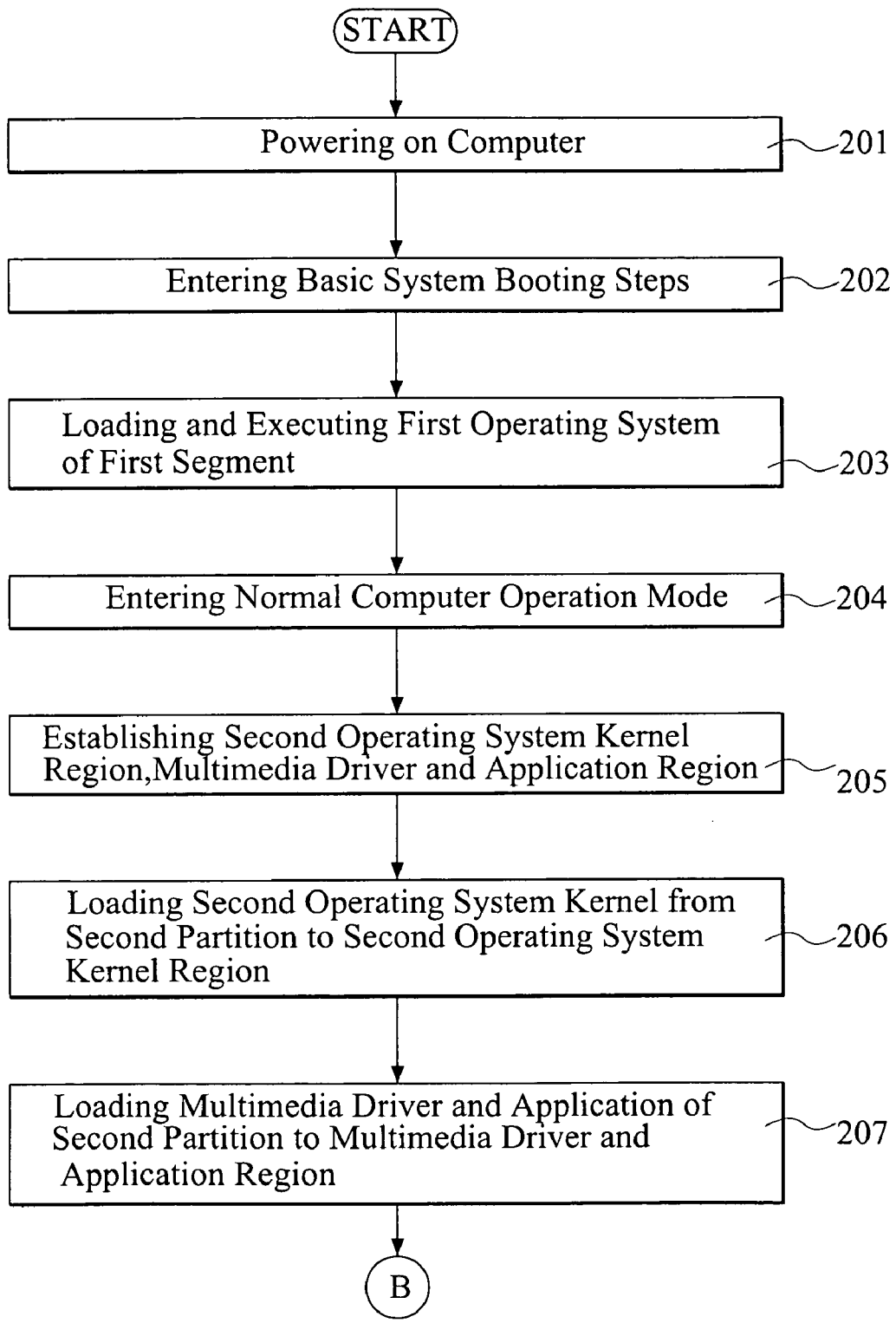
FIG. 5 is the first part of the control flowchart of the embodiment of FIG. 4.
Figure 6:
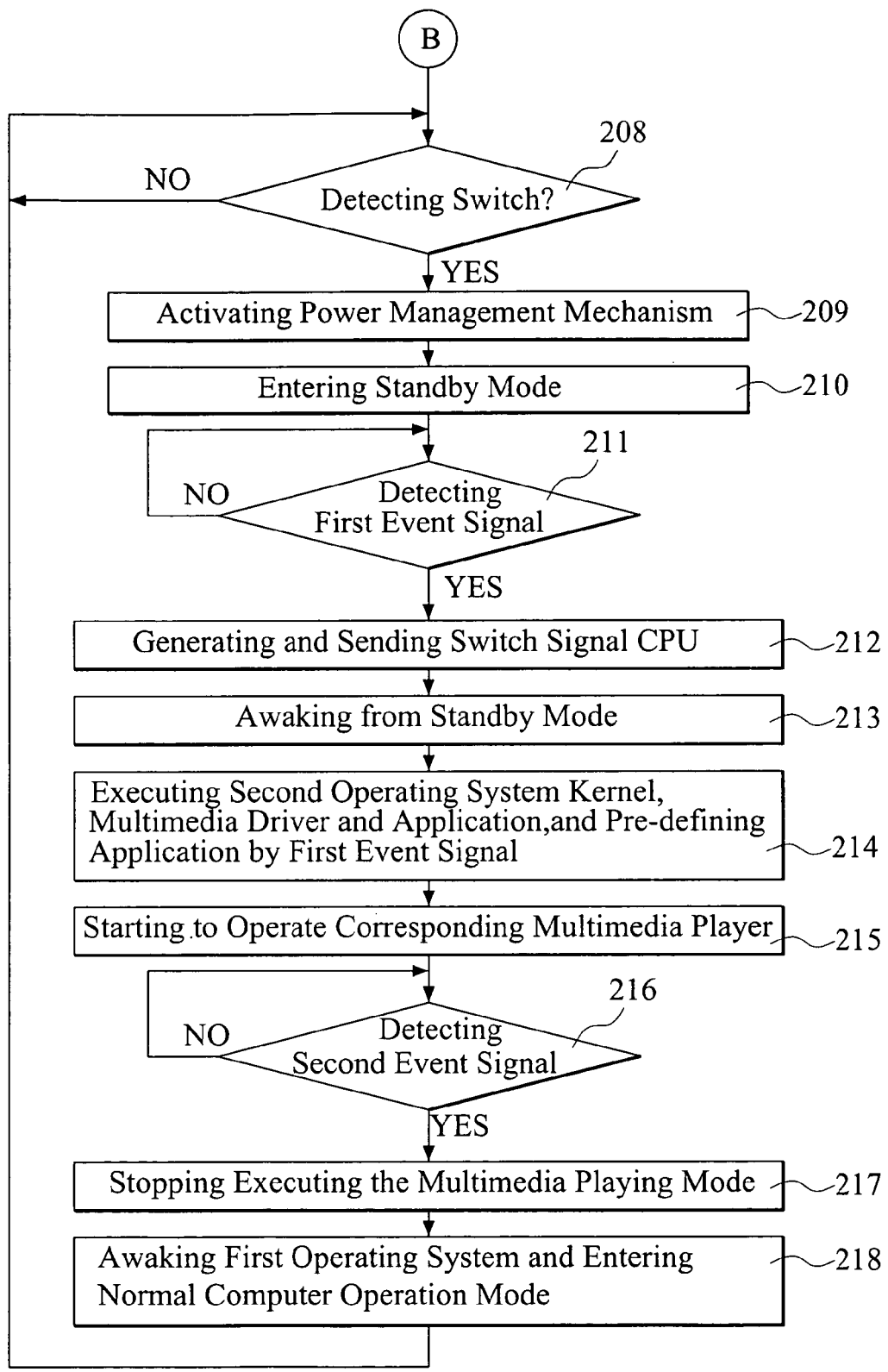
FIG. 6 is the second part of the control flowchart of the embodiment of FIG. 4.

FIGS. 5 and 6 show the control flowchart of the embodiment in FIG. 4. The following description refers to FIGS. 4, 5, and 6. When the computer 100 is powered on (step 201), the computer 100 enters the basic system booting steps (step 202). That is, the computer 100 loads and executes the BIOS program 161 and the POST program 162 from the BIOS memory 16. Then, the computer 100 loads and executes the first operating system 171a of the first partition 171 of the hard disk 17 (step 203), and then the computer 100 enters the normal computer operation mode (step 204). At this point, the user can operate the computer 100 in the normal computer operation mode.

After loading and executing the first operating system 171a, the computer 100 establishes a second operating system kernel region 141 in the system memory 14 and a multimedia driver and application region 142 (step 205), and loads the second operating system kernel 172b from the second partition 172 of the hard disk 17 to the second operating system kernel region 141 (step 206) with a protected mode to reside in the system memory 14. Then, the computer 100 loads the multimedia driver 172c and application 172d of the second partition 172 of the hard disk 17 to the multimedia driver and application region 142 (step 207).

When the user operates the switch 31 to shut down the computer 100, the present invention detects the state of the switch 31 (step 208), and the power management mechanism 18 is activated (step 209). Under the management of the power management mechanism 18, the computer 100 enters the standby mode (step 210) and the first operating system 171a also enters the standby mode. In the standby mode, power supplied to the display 15, the hard disk 17, the CPU 11 is shut off, and only a minimum power is supplied to the system memory 14 and the keyboard controller 2.

After the computer 100 enters the standby mode, the keyboard controller 2 detects the state of the event signal generating unit 24. If the event signal generating unit 24 is pressed by the user, the event signal generating unit 24 generates a first event signal s1. The first event signal s1 is detected by the keyboard controller 2 (step 211), and the keyboard controller 2 generates a switch signal sw and sends the switch signal sw to the CPU 11 (step 212).

When the CPU 11 receives the switch signal sw, the computer 100 awakes from the standby mode (step 213), executes the second operating system kernel 172b in the second operating system kernel region 141 of the system memory 14 and executes the multimedia driver 172c and the application 172d in the multimedia driver and application 142 pre-defined by the first event signal s1 (step 214) to enter the multimedia playing mode. In this way, the corresponding multimedia player 19 starts to operate (step 215) and the user can activate the multimedia playing without the tedious rebooting process of the computer 100.

During the multimedia playing mode, if a second event signal s2 is detected (step 216), the computer 100 stops executing the multimedia playing mode (step 217). That is, the computer 100 stops the second operating system kernel 172b, the multimedia driver 172c, and the application 172d. Then, the first operating system 171a is awakened and the computer 100 enters the normal computer operation mode (step 218). Hence, the computer 100 can switch to the first operating system 171a without rebooting.

While the invention has been described in connection with what is presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. A method of fast booting for computer multimedia playing from a standby mode, applicable to a computer having a central processing unit, a data storage connected to the central processing unit, a system memory, a basic input/put system (BIOS), and at least a multimedia player, the data storage installed with a first operating system and a second operating system kernel, the computer being operable in a normal computer operation mode, the standby mode, and a multimedia playing mode by being controlled by a power management mechanism, the method comprising the following steps:

(a) booting the computer with the first operating system to enter the normal computer operation mode;

(b) establishing a second operating system kernel region in the system memory;

(c) loading the second operating system kernel to the second operating system kernel region;

(d) when a user operates a switch for shutting down the computer, activating the power management mechanism to enable the computer to enter the standby mode and the first operating system to enter the standby mode;

(e) detecting a first event signal triggered by the user while the computer is in the standby mode;

(f) generating a switch signal to the central processing unit upon detecting the first event signal; and (g) awaking the computer from the standby mode and executing the second operating system kernel in the second operating system kernel region to enable the computer to enter the multimedia playing mode.

2. The method as claimed in claim 1, wherein the data storage is a hard disk and the hard disk is divided into a first partition and a second partition, with the first partition installed with the first operating system and the second partition installed with the second operating system kernel, a multimedia driver and a multimedia application.

3. The method as claimed in claim 1, wherein a minimum power supply is provided to the system memory when the computer enters the standby mode.

4. The method as claimed in claim 1, wherein the data storage of the computer stores at least a multimedia driver and at least a multimedia application for the multimedia player corresponding to a first event signal, and wherein, after step (g), the method further comprises a step of loading and executing the multimedia driver and the multimedia application corresponding to the first event signal from the data storage so that the multimedia player corresponding to the first event signal is activated.

5. The method as claimed in claim 1, further comprising the following steps after step (g):

(h) detecting a second event signal triggered by the user when the computer is in the multimedia playing mode;

(i) stopping the multimedia playing mode upon detecting the second event signal; and (j) awaking the first operating system to enable the computer entering the normal computer operation mode.

6. The method as claimed in claim 1, wherein the second operating system is stored in the second operating system kernel region in a compressed format.

7. A method of fast booting for computer multimedia playing from a standby mode, applicable to a computer having a central processing unit, a data storage connected to the computer, a system memory, a basic input/put system (BIOS), and at least a multimedia player, the data storage installed with a first operating system and a second operating system kernel, the computer being operable in a normal computer operation mode, the standby mode, and a multimedia playing mode by being controlled by a power management mechanism, the method comprising the following steps:

(a) the computer completing booting process with the first operating system to enter the normal computer operation mode;

(b) establishing a second operating system kernel region and a multimedia driver and application region in the system memory;

(c) loading the second operating system kernel to the second operating system kernel region;

(d) loading at least a multimedia driver and at least a multimedia application to the multimedia driver and application region;

(e) when a user operates a switch for shutting down the computer, activating the power management mechanism to enable the computer to enter the standby mode and the first operating system to enter the standby mode;

(f) detecting a first event signal triggered by the user while the computer is in the standby mode;

(g) generating a switch signal to the central processing unit upon detecting the first event signal;

(h) awaking the computer from the standby mode and executing the second operating system kernel in the second operating system kernel region to enable the computer to enter the multimedia playing mode; and (i) executing the multimedia application using the second operating system.

8. The method as claimed in claim 7, wherein the data storage is a hard disk and the hard disk is divided into a first partition and a second partition, with the first partition installed with the first operating system and the second partition installed with the second operating system kernel, the multimedia driver and the multimedia application.

9. The method as claimed in claim 7, wherein a minimum power supply is provided to the system memory when the computer enters the standby mode.

10. The method as claimed in claim 7, wherein the multimedia driver and the multimedia application of step (d) are loaded from the data storage of the computer.

11. The method as claimed in claim 7 further comprising the following steps after step (i):

(j) detecting a second event signal triggered by the user when the computer is in the multimedia playing mode;

(k) stopping the multimedia playing mode upon detecting the second event signal; and (l) awaking the first operating system to enable the computer entering the normal computer operation mode.

12. The method as claimed in claim 7, wherein the second operating system is stored in the second operating system kernel region in a compressed format.

* * * * *